United States Patent [19]

Shimizu et al.

[11] 4,373,116
[45] Feb. 8, 1983

[54] VOICE TRIP INFORMATION SYSTEM FOR AN AUTOMOTIVE VEHICLE

[75] Inventors: Michiro Shimizu, Yokohama; Masakazu Tsunoda, Fujisawa, both of Japan

[73] Assignee: Nissan Motor Company, Limited, Kanagawa, Japan

[21] Appl. No.: 193,815

[22] Filed: Oct. 3, 1980

[30] Foreign Application Priority Data

Oct. 4, 1979 [JP] Japan .................................. 54-127353

[51] Int. Cl.³ .............................................. G10L 1/00
[52] U.S. Cl. ............................. 179/1 SM; 179/1 VE
[58] Field of Search ............. 179/1 SM, 1 VE, 1 SG; 340/147, 148, 62, 53, 263; 364/424

[56] References Cited

U.S. PATENT DOCUMENTS 3,431,498  3/1969  Varterian .................. 179/1 VE
3,641,496  2/1972  Slavin ....................... 179/1 SM
3,823,383  7/1974  Mallinger .................... 340/62
3,870,818  3/1975  Barton ....................... 179/1 SM

FOREIGN PATENT DOCUMENTS 1195482  6/1970  United Kingdom .

OTHER PUBLICATIONS

Smith, "Single Chip Speech Synthesizers", Computer Design, Nov. 1978, pp. 188-192.

Primary Examiner—Emanuel S. Kemeny
Attorney, Agent, or Firm—Lowe, King, Price & Becker

[57] ABSTRACT

A voice trip information system for an automotive vehicle, by which the driver is informed of trip information such as trip time interval, trip distance, amount of fuel consumed, fuel consumption rate and so on, whenever the ignition switch is turned off. The voice trip information system comprises a vehicle speed sensor, a fuel amount sensor, a clock device, and a voice synthesizer. Further, a timer function is provided so that the initial trip data are not reset if the ignition switch is turned off and on again within a predetermined period of time. The driver can hear the voice information at an appropriate sound level as adjusted by driver perference.

7 Claims, 5 Drawing Figures

VOICE TRIP INFORMATION SYSTEM FOR AN AUTOMOTIVE VEHICLE

BACKGROUND OF THE INVENTION

1. Field of the Invention

The present invention relates generally to a voice information system for an automotive vehicle, and more particularly to a trip information system such that the driver is informed of various trip information such as distance traveled, duration of trip, amount of fuel consumed, and fuel consumption rate, in voice form, whenever the driver turns off the ignition switch to stop the engine.

2. Description of the Prior Art

In a vehicle various meters are typically provided, such as a trip distance meter, a clock and a fuel meter. Conventionally, therefore, a driver must visually check various meters for various data. For instance, the driver must find the distance traveled by looking at the trip distance meter, remember the remaining fuel amount and the time when the trip starts, recheck the remaining fuel amount and the time when the trip ends, and calculate the consumed fuel amount, the duration of the trip, and the fuel consumption rate from these data in order to know the trip information.

However, since this procedure is troublesome. Since the various data items are indicated to the driver only visually, the driver would usually overlook these data and neglect the calculation, except in a situation when the driver positively wants to know these data and the calculation results. Particularly, when the driver stops the vehicle to get out of the vehicle, since the driver's attention is directed toward the outside, the data on the meters fixed on the instrument panel are prone to be neglected.

Recently, there has appeared a vehicle where a driving computer is mounted to display digitally various trip information such as, for example, distance traveled and fuel amount consumed whenever one of the push-buttons is depressed by the driver. Even in this case, however, the trip information is not indicated to the driver unless the driver depresses the operating push-button for the purpose of obtaining the particular item of information.

BRIEF SUMMARY OF THE INVENTION

With these problems in mind, therfore, it is the primary object of the present invention to provide a voice-form information system for an automotive vehicle such that the initial basic trip data of start distance reading, remaining fuel and starting time are stored in a memory when the ignition switch is turned on, and the current trip information calculated from the initial basic trip data and current reading is indicated to the driver, in voice form, when the ignition switch is turned off.

In this case, the system is so designed that the initial basic trip data are not reinitialized even if the ignition switch is turned off and on again within a predetermined period of time. This is because such a chain of trips (e.g. over one day) may be regarded as one trip, even if the engine is turned off for a brief resting period, for example, to take a rest or to refuel.

To achieve the above-mentioned object, the voice information system of the present invention comprises a plurality of sensors for obtaining necessary trip data and a voice synthesizer.

BRIEF DESCRIPTION OF THE DRAWINGS

The features and advantages of the voice-form information system of the present invention will be more clearly appreciated from the following description taken in conjunction with the accompanying drawings in which like reference numerals designate corresponding elements, and in which.

DETAILED DESCRIPTION OF THE PREFERRED EMBODIMENTS

Figure 1:
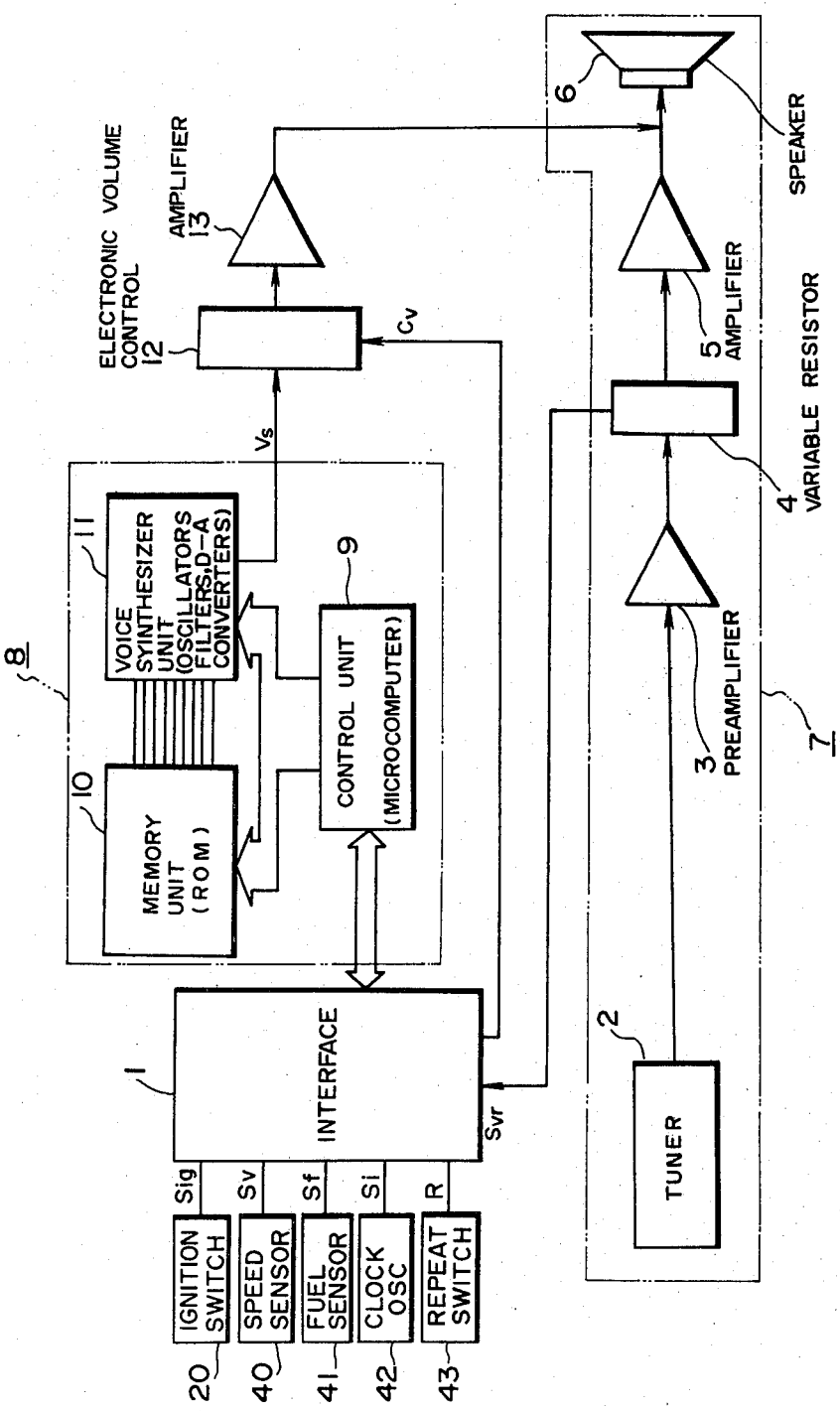
FIG. 1 is a schematic block diagram of a first embodiment of the present invention.

Reference is now made to the figures, and more specifically to FIG. 1, wherein a preferred embodiment of the present invention is illustrated.

In FIG. 1, the numeral 1 denotes an input/output interface including waveform shapers, dividers, A/D converters, a multiplexer, and latch circuits, to which are input various signals such as an on/off signal $S_{ig}$ of an ignition switch signal 20, a vehicle speed signal $S_v$ from a speed sensor 40, a fuel amount signal $S_f$ from a fuel sensor 41, a clock signal $S_i$ from an electronic clock oscillator 42, an on/off signal of a repeat switch 43, a sound volume signal $S_{VR}$ indicating a sound volume value as set by and a volume control 4 (variable resistor) provided in a car radio 7. In this case, the car radio 7 comprises a tuner 2, a preamplifier 3, a volume control 4, an amplifier 5, and a speaker 6.

The vehicle speed signal $S_v$ is shaped to a rectangular pulse signal through the waveform shaper in the interface 1 and is divided into, for instance, one pulse per kilometer through a divider to form a distance signal.

The fuel amount voltage signal $S_f$ from the fuel sensor is converted into a frequency signal according to the voltage level through a V-F converter in the interface 1, and then shaped to a rectangular pulse signal.

Subsequent to the waveshaping, these signals are read into a microcomputer, provided in a control unit 9 in a voice synthesizing system 8, at their respective predetermined timings in order to be processed in accordance with a program.

The numeral 8 denotes a voice synthesizing system of a linear prediction coding (LPC) system formed of three LSI units, which comprises a memory unit (ROM) 10, a synthesizer unit 11 (oscillators, filters, and D-A converters), and a control unit or microcomputer 9. This control unit 9 is a microcomputer comprising a CPU for controlling all the operations, a memory (ROM) for storing programs and fixed data, a memory (RAM) for storing input/output data, a clock oscillator and so on.

The control unit 9 processes various signals input through the interface 1, stores various initial basic data such as distance traveled, fuel consumed, and the time interval, calculates these data for obtaining the necessary trip information, and controls the voice synthesizer unit 11 in order to synthesize a spoken message including trip information, depending on a program and using the method of time sharing. That is to say, the unit 9 serves as a controller for the microcomputer and the voice synthesizer unit.

In the preferred embodiment, the whole system is so designed that power is supplied thereto when the ignition switch is turned on. The system also includes a timer function to maintain the power for a predetermined period of time after the ignition switch is turned off.

Figure 2:
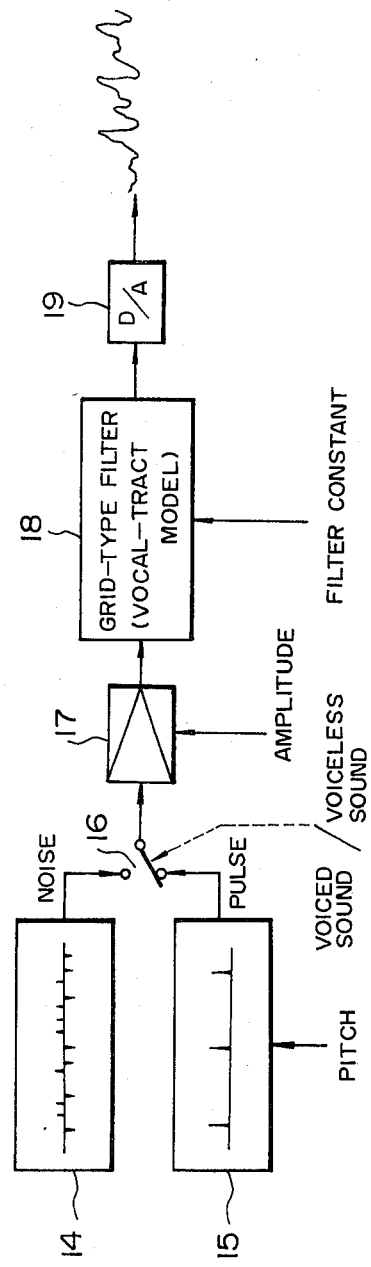
FIG. 2 is a schematic block diagram helpful in explaining the theory of operation of a voice synthesizer using a linear prediction coding system (LPC)

As is well known in the art, a voice synthesizer based on the LPC system has recently been put on the market at a reasonable price by Texas Instrument Incorporated of the U.S.A. FIG. 2 shows schematically the principle of operation of this voice synthesizer.

In this synthesizer, pseudo-random noise signals N generated by the first sound source oscillator (white noise generator) 14 are selected by a switch 16 to produce voiceless sounds, and periodic impulse signals P generated by the second source oscillator (impulse generator) 15 are selected by the switch 16 to produce voiced sounds. After being amplified by an amplifier 17, these signals N and P are formed into a voice by a grid-type filter 18 where the resonance characteristics of the human vocal tract (vocal organs such as tongue and lips located above the vocal chords) in speaking are modeled, and are output as a synthesized voice signal after conversion into an analog signal through a D-A converter 19.

The different values of constants such as the pitch of the periodic impulse signal, the distinction between voiced and voiceless sounds, the ratio of the amplification of the amplifier 17, and the filter constants of the grid-type filter 18, are stored in the memory unit (ROM) 10 of FIG. 1.

The voice synthesizer unit 11 comprises various circuits which correspond to a first sound source oscillator 14, a second sound source oscillator 15, a switch 16, an amplifier 17, a grid-type filter 18, a D-A converter 19 so that the synthesized voice sound signal $V_s$ necessary for trip information can be output after being controlled according to the output signal selected by the control unit 9.

The voice signal $V_s$ outputted from the voice synthesizer 8 is adjusted by means of an electronic volume control 12, amplified by an amplifier 13, and output through a speaker 6 provided in the car radio 7.

In this case, the microcomputer in the control unit 9 determines the voice output volume according to a sound volume value as set by the volume control 4 provided in the car radio 7 (determined by the use of a signal $S_{VR}$) and outputs a voice volume control signal $C_v$ through the interface 1 to the electronic volume control 12, so that the voice volume can be adjusted to an appropriate level based on driver preference.

Figure 3:
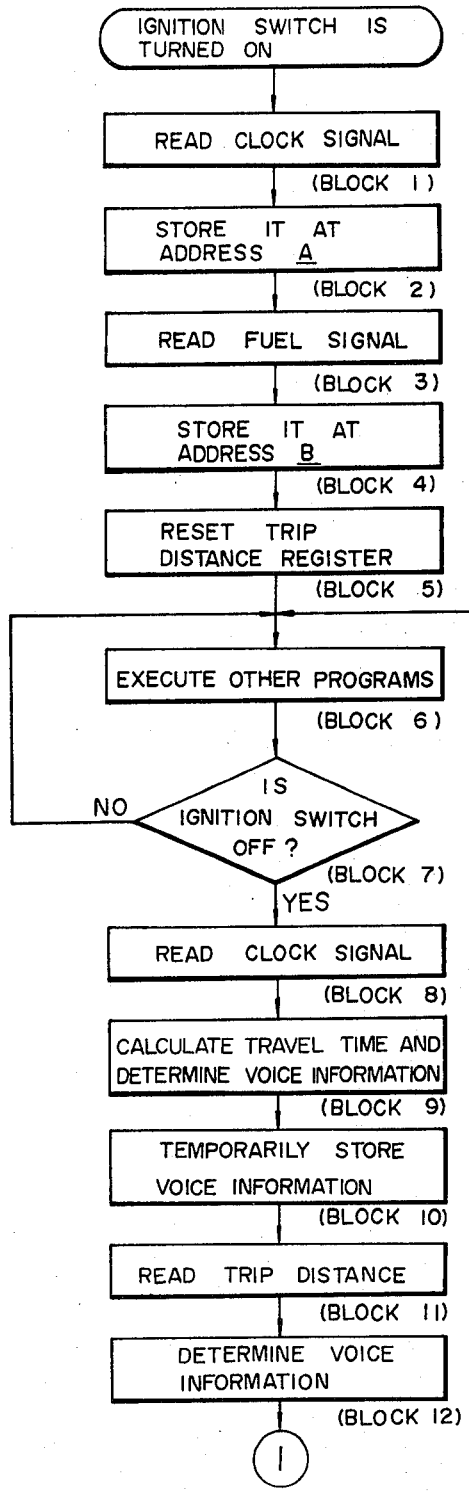
FIGS. 3a and 3b are an example of a flowchart for a program used with the embodiment of FIG. 1.
Figure 3B:
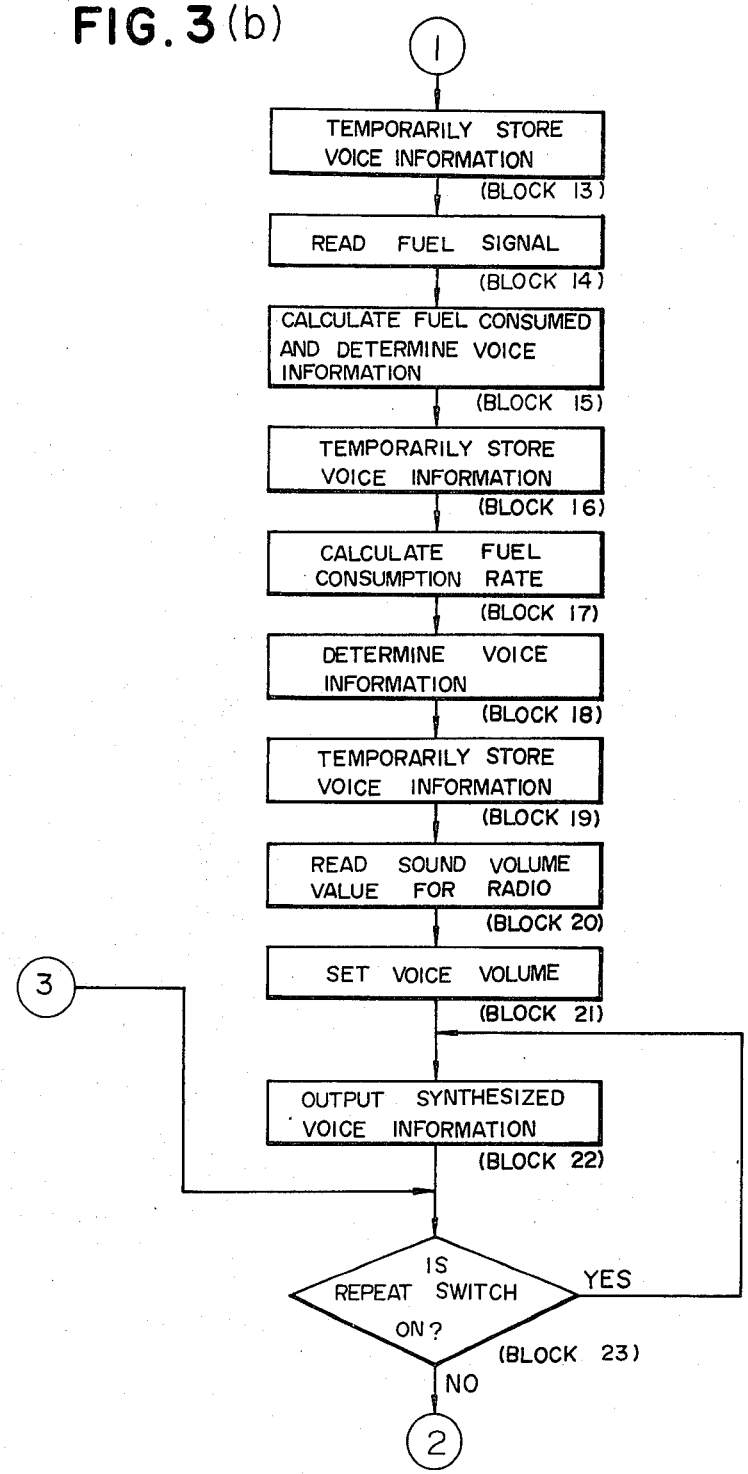

FIG. 3 shows an illustrative flowchart used with the microcomputer in the control unit 9.

In this flowchart, when the ignition switch is turned on, the microcomputer starts to execute the trip information program. First, the program reads the clock signal from the electronic clock device through the interface (Block 1), stores it at address A in the register (Block 2), reads the fuel signal from the fuel sensor through the interface 1 (Block 3), and then stores it at address B in the register (Block 4). Next, the vehicle speed signal $S_v$ is shaped and divided into a distance pulse signal having one pulse per kilometer through the interface 1, and resets a trip distance register which counts the travel distance pulse signal (Block 5). Next, provided that the ignition switch is kept on, other programs not relating to the present invention are, if necessary, executed repeatedly (Block 6).

If the ignition switch is turned off (Block 7), the clock signal from the electronic clock is read through the interface 1 (Block 8), the travel time interval is calculated from the clock signal previously stored at address A in the register, and voice information such as, "Trip time was one hour thirty minutes" is determined in accordance with the calculated trip data (Block 9). This voice information is temporarily stored in the RAM of the microcomputer (Block 10).

Next, a trip distance data is read from the trip distance register (Block 11), and voice information such as, for instance, "Trip distance is 80 Km" is determined in accordance with the trip distance data (Block 12), and this voice information is temporarily stored in the RAM (Block 13).

Next, the fuel signal $S_f$ is read through the interface 1 (Block 14), the amount of fuel consumed is calculated based on the fuel data previously stored at address B in the register, and voice information such as "Five liters of fuel consumed" is determined in accordance with fuel consumed data (Block 15). This voice information is temporarily stored in the RAM of the microcomputer (Block 16).

Further, based on the trip distance data and fuel consumed data, the fuel consumption rate is calculated (Block 17), and voice information such as "Fuel consumption is 16 kilometers per liter" is determined in accordance with the fuel consumption data (Block 18). This voice information is temporarily stored in the RAM of the microcomputer (Block 19).

Next, the program reads a signal $S_{VR}$ to determine the voice information volume according to the sound volume value as set by the volume control 4 in the car radio 7 according to driver preference (Block 20), determines the voice volume value, and sets the electronic volume control 12 to set the voice volume (Block 21).

At this step, in accordance with the trip data messages such as trip time, trip distance, amount of fuel consumed, and fuel consumption rate, which have previously been stored in the RAM in the microcomputer 9, the memory unit 10 and the voice synthesizer unit 11 are operated. Synthesized voice signals $V_s$ are produced and output through the electronic volume control 12, the amplifier 13 and the speaker 6 to inform the driver of the trip information in voice form (Block 22).

After that, the program checks whether the repeat switch is on (Block 23), and, if on, the same trip information is output again. This repeat switch is useful when the driver fails to heat the voice information properly.

Next, the program checks whether the ignition switch has been turned back on again (Block 24). If the ignition switch is turned on again within a given period of time (e.g. two hours), the program executes the steps again beginning from Block 6. If the ignition switch is off, the program checks whether the given period has elapsed (Block 25). If elapsed with the ignition switch kept off, the program ends; if not elapsed with the switch off, the program goes to Block 23 to check whether the repeat switch is on.

In addition, although the above examples show the case where the initial basic data are kept as they are if the ignition switch is turned off and on again within a given period of time, it is, of course, possible to design the system so that the trip information is always reset when the ignition switch is turned off. In this case, unless the repeat switch is turned on within a given period of time, the program ends.

Figure 4:
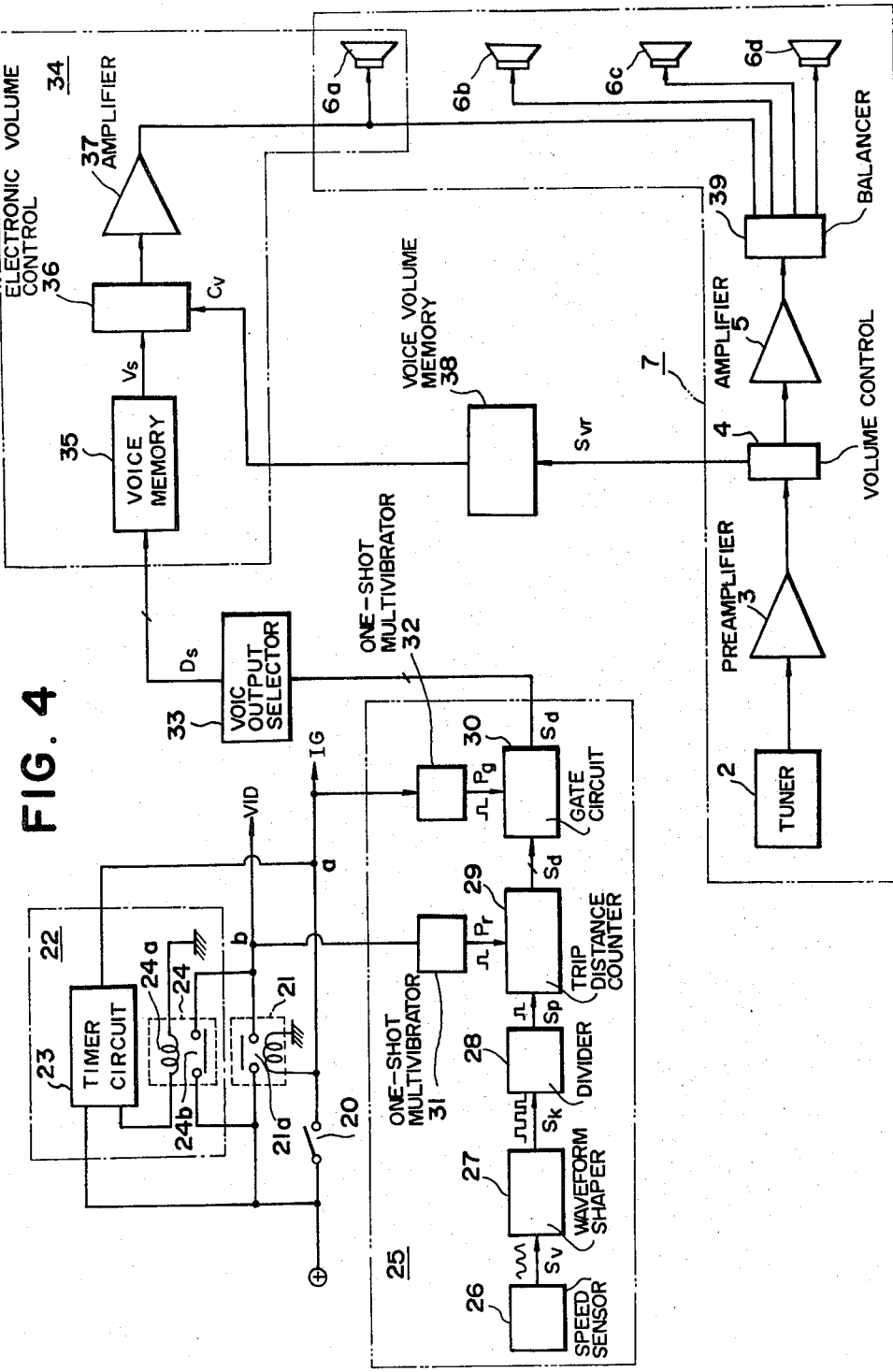
FIG. 4 is a schematic block diagram of a second embodiment of the present invention.

FIG. 4 shows an example schematic block diagram of another embodiment of the present invention, in which only the trip distance information is indicated to the driver.

In this figure, the numeral 20 denotes an ignition switch to supply the battery voltage to an ignition circuit (not shown) when turned on. The numeral 21 denotes a relay for closing contacts 21a to supply voltage to the voice-form information device (VID).

The numeral 22 denotes a timer unit including a timer circuit 23 and a relay 24 with a relay coil 24a and relay contacts 24b, by which the power continues to be supplied to the voice-form information device VID for a given period of time (e.g. two hours) after the ignition switch 20 is turned off. In this case, the timer circuit 23 starts when the potential at point a goes low when the ignition switch 20 is turned off and is reset when the potential goes high. When the timer circuit 23 starts, the timer unit 22 immediately activates the relay 24 to close the normally-opened contacts 24b for a given period of time.

Accordingly, even if the ignition switch is turned off and if the relay contacts 21a open, since the relay contacts 24b are closed, the power is supplied to the voice information device until the given period of time elapses.

It is also possible to use another switch, operated together when the ignition switch is turned on, instead of the contacts 21a.

The numeral 25 denotes a trip distance determining unit, where a vehicle speed signal $S_v$ with a frequency proportional to the number of revolutions of the transmission shaft is detected with a vehicle speed sensor 26, shaped to a rectangular pulse signal $S_k$ through a waveform shaper 27, and divided into a pulse signal $S_p$ of, for instance, one pulse per kilometer through a divider 28. This pulse signal $S_p$ is counted by a trip distance counter 29, and the counted value is outputted to the next stage as trip distance data $S_d$ through a gate circuit 30.

The trip distance counter 29 is reset by an output pulse $P_r$ when the ignition switch 20 is first turned on to close the contacts 21a of the relay 21 and a one-shot multivibrator 31 is triggered by a voltage rise at point b.

When the ignition switch 20 is turned off, since the point a goes from high to low, another one-shot multivibrator 32 is triggered and the output pulse $P_g$ opens the gate circuit 30 to output the counted value of the trip distance counter 29 as a trip distance data $S_d$.

If the ignition switch 20 is turned on again while the timer circuit 23 is still operating (e.g. within two hours), since the point b is kept high, the one-shot multivibrator 31 is not triggered and the trip distance counter 29 is not reset.

The numeral 33 denotes a voice output selector, which inputs trip distance data $S_d$ output by the trip distance determining unit 25 when the ignition switch 20 is turned off, as explained above, selects voice information in accordance with the trip distance data, such as "Trip distance is ten kilometers" which has previously stored in a voice memory 35 of a voice output unit 34, and outputs a voice output designation signal $D_s$ as, for instance, a many-bit binary signal with a plurality of bits.

In the voice memory 35 of the voice output unit 34, voice information in units of sentences, phrases, words, or phones is previously stored to inform the driver of the trip distance information, as explained above, and is output as a series of voice signals $V_s$ after selection in accordance with the voice output designation signal $D_s$ generated from the voice output selector 33.

Although it is possible to use the same voice synthesizer as in the first embodiment, a magnetic tape or sheet can be used in this embodiment because the amount of trip distance information is relatively small. In this case, two sets of voice information such as, for instance, the numerical values from 1 to 200 and "Trip distance is . . . kilometers" are magnetically stored separately, selected in accordance with the voice output designation signal $D_s$, and assembled together for reproducing a series of voice signal $V_s$.

In the voice output unit, the numeral 36 denotes an electronic volume controller of voltage control type including transistors and FETs, whereby the level of the voice signal $V_s$ output from the voice memory 35 is controlled according to a voice control signal $C_v$ (explained later) from a voice volume memory 38. The numeral 37 denotes an audio amplifier, and the voice amplified by the audio amplifier 37 is reproduced through one of a plurality of loudspeakers 6a to 6d provided for other audio equipment such as a car radio 7.

As is well known, a conventional car radio 7 comprises a tuner 2, a preamplifier 3, a volume control 4 (variable resistor), an amplifier 5, and a balancer 39 to balance the respective sound volume of the speakers 6a–6d (unnecessary when only one speaker is used).

The numeral 38 denotes a voice volume memory for storing a sound volume value as set by the volume control 4 in the car radio 7. When a usual rotary type or linear motion type variable resistor is used for the control 4, a variable resistor of the same type can be used by connection thereto. On the other hand, when an electronic volume control is used (controllable from the outside), the voice volume memory 38 must store the control voltage signal electrically even when the power supply of the car radio 7 is turned off, in order to control the electronic volume control 36 by the voice volume control signal $C_v$.

As described above, the voice information device comprises the trip distance determining unit 25, a voice output selector 33, a voice output unit 34, and a voice volume memory 38. According to this embodiment, when the ignition switch 20 is turned on, the voice information device starts to operate; the trip distance determining unit 25 counts the trip distance. Whenever the vehicle is stopped and the ignition switch is turned off, the voice output unit 34 informs the driver of trip distance information, in voice form. If the ignition switch is turned off, on the way to the destination for a rest, for example, and then the switch is turned on again within the time limit (e.g. within two hours) preset by the timer circuit 23, the trip distance from the initial start point is indicated to the driver.

In this second embodiment, it is, of course, possible also to input a fuel signal and a clock signal for informing the driver of various trip information such as amount of fuel consumed, trip time interval and so on. In this case, however, a multiplexer for selectively outputting one of various signals will be necessary.

As described above, according to the present invention, when the ignition switch is turned on, various initial basic data are stored; when turned off, various trip information based on the initial data is indicated to the driver in voice form.

In addition, since it is possible to design the system so that the initial basic data are not initialized even if the ignition switch is turned off and on again within a predetermined period of time, the drive can obtain trip information based on the initial data in such a system even if the vehicle is stopped for a rest on the way to the destination.

It will be understood by those skilled in the art that the foregoing description is in terms of preferred embodiments of the present invention wherein various changes and modifications may be made without departing from the spirit and scope of the invention, which is to be designed by the appended claims.

What is claimed is:

1. A voice trip information system for an automotive vehicle provided with an engine, which comprises:
    (a) an ignition switch for outputting an ignition-on signal $S_{ig}$ when turned on and an ignition off-signal when turned off;
    (b) a speed sensor for detecting vehicle speed and for outputting a vehicle speed signal $S_V$;
    (c) a fuel sensor for detecting an amount of fuel and for outputting a fuel amount signal $S_f$;
    (d) a clock oscillator for outputting a clock signal $S_i$;
    (e) an interface including interconnected waveform shapers, dividers, A-D converters, a multiplexer and latch circuits, said interface being connected to said ignition switch, said speed sensor, said fuel sensor, and said clock oscillator for waveform shaping the vehicle speed signal $S_V$ to a rectangular pulse signal, dividing the shaped vehicle speed signal $S_V$ into one pulse per predetermined distance to obtain a distance signal, converting the fuel amount signal $S_f$ into a frequency signal corresponding thereto, and sequentially transferring the signals input thereto in a time-shared sequence;
    (f) a voice synthesizing system including:
        (1) a voice synthesizer;
        (2) a memory unit connected to said voice synthesizer for temporarily storing voices synthesized thereby; and
        (3) a control unit connected to said interface, said voice synthesizer and said memory unit, said control unit formed by a microcomputer having a central processing unit, a read only memory for storing programs and fixed data, and a random access memory;
    (g) said control unit including means for outputting first command signals, in response to the ignition-on signal $S_{ig}$, to said interface to read the vehicle speed signal $S_V$, the fuel amount signal $S_f$ and the clock signal $S_i$, for storing of these signals as initial basic data,
    second command signals, in response to the ignition-off signal, to said interface to read the current vehicle speed signal $S_V$, the current fuel amount signal $S_f$ and the current clock signal $S_i$, for calculating travel time based on the initial and current clock signals $S_i$; travel distance based on the distance signal obtained from the vehicle speed signals $S_V$; fuel consumed based on the initial and current fuel amount signals $S_f$; and fuel consumption rate based on the calculated travel distance and fuel consumed; and
    third command signals to said voice synthesizer to determine a plurality of voice messages in accordance with the obtained travel time, travel distance, fuel consumed and fuel consumption rate and to output each of determined voice form messages after having temporarily stored each in said memory unit,
    whereby travel time, travel distance, fuel consumed and fuel consumption rate are indicated, in voice form, when said ignition switch is turned off.

2. A voice warning system for an automotive vehicle as set forth in claim 1, which further comprises:
    (a) a relay including a relay coil and a pair of contacts, and two contacts being connected in parallel with said ignition switch; and
    (b) a timer connected to said relay coil for energizing said relay coil for a predetermined period of time to close said contact pair for said predetermined period of time when said ignition switch is turned off,
    whereby the ignition switch is kept turned on for a period of time determined by said timer without resetting the initial stored trip data, even if said ignition switch is temporarily turned off for a time shorter than said predetermined period of time.

3. A voice warning system for an automotive vehicle as set forth in claim 2, which further comprises:
    (a) a volume control means provided in a car radio and connected to said interface for providing a sound volume signal $S_{VR}$ thereto indicative of a car-radio sound volume value; and
    (b) an electronic volume controller connected to said voice synthesizer and said interface for adjusting voice volume of the determined voice form message in accordance with a voice volume control signal $C_V$ from said interface,
    whereby the volume of the determined voice messages is determined according to car-radio sound volume as adjusted by driver preference.

4. A voice warning system for an automotive vehicle as set forth in either claim 2 or 3, which further comprises a repeat switch connected to said interface for outputting a repeat switch signal R to repeat the determined voice messages when said repeat switch is turned on.

5. A voice warning system for an automotive vehicle as set forth in claim 3 wherein said volume control means comprises a variable resistance.

6. A method of indicating to a vehicle driver trip information for an automotive vehicle in voice form, which comprises the steps of:
    (a) detecting whether or not an ignition-on signal $S_{ig}$ is being output by an ignition switch;
    (b) upon detecting the ignition-on signal, reading a clock signal $S_i$ output by a clock oscillator to obtain initial travel time data;
    (c) storing the read clock signal $S_i$ in a memory unit;
    (d) reading a fuel amount signal $S_f$ output by a fuel sensor to obtain initial fuel amount data;
    (e) storing the read fuel amount data in the memory unit;
    (f) resetting a trip distance register by a vehicle speed signal $S_V$ output by a speed sensor;
    (g) detecting whether or not an ignition-off signal is being output by the ignition switch;
    (h) upon detecting that an ignition-off signal is not being output by the ignition switch, repeating step (g), above;
    (i) upon detecting the ignition-off signal, reading the current clock signal $S_i$ output by the clock oscillator to obtain current travel time data;
    (j) calculating travel time on the basis of the initial and current travel time data;

(k) determining a voice form message corresponding to the calculated travel time data;
(l) temporarily storing the determined voice form message in a voice memory unit;
(m) reading the current trip distance data registered in the trip distance register;
(n) determining a voice form message corresponding to the registered trip distance;
(o) temporarily storing the determined voice form message in the voice memory unit;
(p) reading the current fuel amount signal $S_f$ output by the fuel amount sensor to obtain current fuel amount data;
(q) calculating a fuel consumption quantity on the basis of the initial and current fuel amount data;
(r) determining a voice form message corresponding to the calculated quantity of consumed fuel;
(s) temporarily storing the determined voice form message in the voice memory unit;
(t) calculating the current fuel consumption rate on the basis of the trip distance data and the calculated quantity of consumed fuel;
(u) determining a voice form message corresponding to the calculated current fuel consumption rate;
(v) temporarily storing the determined voice form message in the voice memory unit;
(w) reading a sound volume signal $S_{VR}$ from a volume control provided in a car-radio;
(x) setting a voice volume control signal to an electronic volume control in accordance with the sound volume signal; and
(y) outputting the current stored voice form messages in sequence.

7. A method of indicating a driver of vehicle trip information on an automotive vehicle in voice form as set forth in claim 6 which further comprises the following steps of:
(a) determining whether or not a repeat switch-on signal R is being output by a repeat switch;
(b) upon determining the repeat switch-on signal is being output, repeating the step of outputting the stored voice form messages in sequence;
(c) upon determining that the repeat switch-on signal is not being output, determining whether the ignition-on signal $S_{ig}$ is again being output by the ignition switch within a predetermined time interval;
(d) upon determining that the ignition-on signal is again being output during said predetermined time interval, performing the previously recited step of detecting whether the ignition-off signal is output by the ignition switch and the further steps associated therewith;
(e) upon determining that the predetermined time interval has lapsed without output of the ignition-on signal by said ignition switch, ending the procedure.

* * * * *